(12) United States Patent
Shergill et al.

(10) Patent No.: US 10,705,968 B2
(45) Date of Patent: Jul. 7, 2020

(54) BYPASS STORAGE CLASS MEMORY READ CACHE BASED ON A QUEUE DEPTH THRESHOLD

(71) Applicant: HEWLETT PACKARD ENTERPRISE DEVELOPMENT LP, Houston, TX (US)

(72) Inventors: Gurinder Shergill, San Ramon, CA (US); Kouei Yamada, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 32 days.

(21) Appl. No.: 16/205,742

(22) Filed: Nov. 30, 2018

(65) Prior Publication Data

US 2020/0174938 A1 Jun. 4, 2020

(51) Int. Cl.
*G06F 12/08* (2016.01)
*G06F 12/0888* (2016.01)

(52) U.S. Cl.
CPC .. *G06F 12/0888* (2013.01); *G06F 2212/1024* (2013.01)

(58) Field of Classification Search
CPC .......................... G06F 12/0888; G06F 12/0811
See application file for complete search history.

(56) References Cited

U.S. PATENT DOCUMENTS

| | | | |
|---|---|---|---|
| 6,912,612 B2 | 6/2005 | Kapur et al. | |
| 6,922,754 B2 | 7/2005 | Liu et al. | |
| 7,356,651 B2 | 4/2008 | Liu et al. | |
| 7,739,470 B1* | 6/2010 | Norgren | G06F 11/3485 709/224 |
| 8,892,716 B2 | 11/2014 | Gulati et al. | |
| 9,213,628 B2 | 12/2015 | Maheshwari et al. | |
| 9,489,141 B2 | 11/2016 | Nanduri et al. | |
| 9,720,601 B2 | 8/2017 | Gupta et al. | |
| 9,779,026 B2 | 10/2017 | Kumar et al. | |
| 2004/0136712 A1* | 7/2004 | Stiscia | H04J 3/1694 398/60 |
| 2006/0179240 A1 | 8/2006 | Chatterjee et al. | |
| 2012/0047318 A1 | 2/2012 | Yoon et al. | |
| 2012/0072670 A1* | 3/2012 | Jess | G06F 12/0868 711/136 |
| 2012/0124294 A1 | 5/2012 | Atkisson et al. | |
| 2015/0106596 A1 | 4/2015 | Vorbach et al. | |

(Continued)

OTHER PUBLICATIONS

Arulraj, J. et al., "Let's Talk About Storage & Recovery Methods for Non-volatile Memory Database Systems," 2015, https://db.cs.cmu.edu/papers/2015/p707-arulraj.pdf.

(Continued)

*Primary Examiner* — Than Nguyen
(74) *Attorney, Agent, or Firm* — Hewlett Packard Enterprise Patent Department (57) ABSTRACT

Examples may bypass storage class memory (SCM) read cache based on a queue depth threshold. Examples may adjust a queue depth threshold for an SCM read cache based on an amount of data read from and written to the SCM read cache in a time period, and may bypass the SCM read cache based on a comparison of a number of outstanding IOs for the SCM read cache to a queue depth threshold for the SCM read cache.

20 Claims, 5 Drawing Sheets

(56) References Cited

U.S. PATENT DOCUMENTS

| | | | |
|---|---|---|---|
| 2015/0286438 A1* | 10/2015 | Simionescu | G06F 12/0246 711/103 |
| 2015/0355883 A1 | 12/2015 | Kegel | |
| 2016/0291885 A1 | 10/2016 | Pendharkar et al. | |
| 2018/0081832 A1 | 3/2018 | Longo et al. | |
| 2019/0042452 A1* | 2/2019 | Clark | G06F 12/0888 |

OTHER PUBLICATIONS

Dulloor et al., "System Software for Persistent Memory," Apr. 13-16, 2014, EuroSys 2014, <https://courses.engr.illinois.edu/ece598ms/sp2018/papers/paper45.pdf>.

IBM Almaden Research Center, "MIEC* Access Device for 3D-Crosspoint Nonvolatile Memory Arrays," 2012,<https://researcher.watson.ibm.com/researcher/files/us-gwburr/MIECOverviewPublicDomain_Jan2013_3.pdf>.

IBM Almaden Research Center, "Storage Class Memory," Jan. 2013, <https://researcher.watson.ibm.com/researcher/files/us-gwburr/Almaden_SCM_overview_Jan2013.pdf>.

Margaret Rouse, "3D XPoint," Aug. 2017, <https://searchstorage.techtarget.com/definition/3D-XPoint>.

Michael Rink, "HPE Announcements From Discover Madrid 2018," Nov. 27, 2018, <https://www.storagereview.com/hpe_announcements_from_discover_madrid_2018>.

Wikipedia, "3D XPoint," Oct. 17, 2018, <https://en.wikipedia.org/w/index.php?title=3D_XPoint&oldid=864459675>.

Wikipedia, "Disk Buffer", (web page), available online at <https://en.wikipedia.org/w/index.php?title=Disk_buffer&direction=next&oldid=744111808>, Oct. 13, 2016, 4 pages.

Corbet, Jonathan, "The end of block barriers", (web page), available online at <https://lwn.net/Articles/400541/>, Aug. 2010, 7 pages.

Chris Siebenmann, "Modern disk write caches and how they get dealt with (a quick overview)", (web page), available online at <https://utcc.utoronto.ca/~cks/space/blog/tech/ModernDiskWriteCaches>, Oct. 25, 2013, 2 page.

Chris Siebenmann, "How to force a disk write cache flush operation on Linux" (web page), available online at <https://utcc.utoronto.ca/~cks/space/blog/linux/ForceDiskFlushes>, Oct. 24, 2013, 2 pages.

Huang, H. et al., "Performance Modeling and Analysis of Flash-based Storage Devices," May 23, 2011, IEEE, https://www2.seas.gwu.edu/~howie/publications/MSST11.pdf.

* cited by examiner

BYPASS STORAGE CLASS MEMORY READ CACHE BASED ON A QUEUE DEPTH THRESHOLD

BACKGROUND

In computing devices, such as servers, storage arrays, and the like, a processing resource may read from and write to cache memory with much lower latency compared to other types of storage (e.g., non-volatile storage, such as hard disk drives (HDDs), solid state drives (SSDs), or the like). However, while such cache memory may have much lower latency, it is often implemented by using volatile memory device(s) that do not retain their stored data when they lose power, and generally has a higher cost (per unit of capacity) compared to other types of storage (e.g., non-volatile storage, such as HDDs, SSDs, or the like).

BRIEF DESCRIPTION OF THE DRAWINGS

The following detailed description references the drawings, wherein.

DETAILED DESCRIPTION

Computing devices, such as servers, storage arrays, and the like, may include cache memory implemented by volatile memory, such as dynamic random-access memory (DRAM) device(s), which may be provided in the form of dual in-line memory modules (DIMMs), for example. Such computing devices may also include other types of storage, such as non-volatile storage device(s) that may retain the data stored therein even when they lose power. Such non-volatile storage device(s) (e.g., HDDs, SSDs, or a combination thereof), or the like, may be used by a computing device (such as a storage array) to implement "backend storage" for the computing device (e.g., storage array) for the persistent storage of data in the computing device. Such storage device(s) may use various communication protocols, such as those related to Small Computer System Interface (SCSI) (e.g., Serial Attached SCSI (SAS)), Serial AT Attachment (SATA), or other suitable protocol(s).

In such computing devices, processing resource(s) of the computing device may read data from and write data to the memory device(s) implementing the cache memory with much lower latency (i.e., much faster) than from storage device(s) implementing backend storage for the computing device (e.g., HDDs, SSDs, etc., or a combination thereof). However, the capacity of the cache memory be relatively low compared to the backend storage, so the cache memory may be limited to storing only a small subset of the data stored by the computing device at one time (e.g., much less than all of the data stored by the computing device). In such examples, just a relatively small proportion of the data stored in the backend storage of the computing device may be accessible from the cache memory (with the low latency it provides) at a given time.

In some examples, it may be beneficial to extend the capacity of the cache memory implemented with volatile memory (which may be referred to herein as the "main cache" of a computing device) using non-volatile storage as an extended read cache (or "intermediate" read cache) that is logically placed between the main cache and the backend storage (e.g., other non-volatile storage device(s)) of a computing device. Even though such an extended read cache may have higher latency than the main cache, the extended read cache may have much lower latency than the backend storage of the computing device, and so when there is a cache miss at the main cache, reading the requested data from the extended read cache (if present therein) may allow the requested data to be read into the main cache with much lower latency than if the requested data were read into the main cache from the backend storage of the computing device.

For example, when there is a cache miss at the main cache (i.e., when the data requested by a read request is determined not to be present in the main cache), reading the requested data from a SAS HDD of backend storage into the main cache may take one or more milliseconds (ms) (or more, depending on present utilization of the SAS HDD), thereby adding at least one or more milliseconds of latency to the requested read. Reading the requested data from a SAS SSD of backend storage into the main cache may take about 125 or more microseconds (or more, depending on its present utilization), which may still thereby add significant additional latency to the requested read. Similarly, reading the requested data into the main cache from a SAS SSD of extended read cache (i.e., when the above-described extended read cache is implemented using one or more SAS SSDs) may also take about 125 or more microseconds (or more, depending on present utilization of the SAS HDD), thereby adding significant additional latency to the requested read.

In contrast, when the extended read cache is implemented using storage class memory (SCM), the requested data may be read into the main cache from the SCM implementing the extended read cache as quickly as a number of microseconds in the low teens in some examples, thereby significantly reducing the added latency to read the data into the main cache compared to SAS SSDs (e.g., approximately 10 times lower latency), for example. In examples described herein, an SCM card implementing the extended read cache (at least in part) may be referred to herein as an "SCM read cache".

However, a single SCM device (which may be referred to as an SCM "card" herein) may have a limited rate (e.g., "data rate" or "bandwidth" herein) at which data may be read from and written to the SCM card with low latency. For example, a single SCM card may have a data rate threshold of about 2.4 GB/sec, below which data may be read from or written to the SCM card with low latency. In such examples, when enough input/output (IO) requests (or "IOs" herein; e.g., read and/or write requests) are issued to the SCM card quickly enough that the cumulative amount of data that these IO requests are attempting to read and/or write to the SCM card exceeds the data rate threshold (e.g., about 2.4 GB/sec in some examples), further IO requests issued may experience much lower latency than those IO requests issued before that threshold was exceeded. For example, IO requests issued after the data rate threshold is exceeded may experience latency (e.g., time to read from the SCM into the main cache) that is near or even greater than the above-described latency of a SAS SSD (e.g., about 125 microseconds or more).

In such examples, issuing IO requests to the SCM card such that the data rate threshold is exceeded may lead to an unexpected increase in latency for those IO requests issued after the threshold is exceeded. In such examples, it may be possible to get lower latency by reading from the backend storage rather than from the SCM card once the data rate threshold of the SCM card has been exceeded.

To address these issues, examples described herein may include techniques for selectively (or intelligently) bypassing the SCM read cache and selectively (or intelligently) destaging data from the main cache to the SCM read cache. For example, examples described herein may monitor the amount of data transferred to and from the SCM read cache in a given time period and use that information adaptively adjust one or more queue depth thresholds for the SCM read cache, and drop or redirect IO requests for the SCM read cache that would exceed the appropriate queue depth threshold. In this manner, examples described herein may manage the rate at which data is transferred to and from the SCM read cache to avoid or reduce the number of IO requests issued to the SCM read cache after the data rate threshold is exceeded, to thereby avoid or reduce the number of IO requests that suffer significantly higher latency at the SCM read cache than IO requests issued while the data rate threshold is not exceeded.

For example, examples described herein may determine a total amount of data read from and written to a SCM read cache in a given time period, and adjust adjusting at least one queue depth threshold for the SCM read cache in response to a determination that a data rate threshold for the SCM read cache is exceeded, based on the determined amount of data. Such examples may also, in response to an IO request for the SCM read cache, compare a current number of IOs outstanding for the SCM read cache to one of the queue depth threshold(s) for the SCM read cache, and select between: (1) processing the IO request using the SCM read cache, (2) dropping the IO request, and (3) processing the IO request without using the SCM read cache, based on the type of the IO request and a result of the comparison. Such examples may then perform the selected processing or dropping action.

In this manner, examples described herein may reduce the number of IO requests issued to the SCM read cache that suffer significantly higher latency due to the data rate threshold of the SCM read cache being exceeded. In some examples, monitoring the actual amount of data read from and written to the SCM read cache over a given time period may enable relatively accurate tracking of whether the data rate threshold of the SCM read cache is exceeded.

Figure 1:
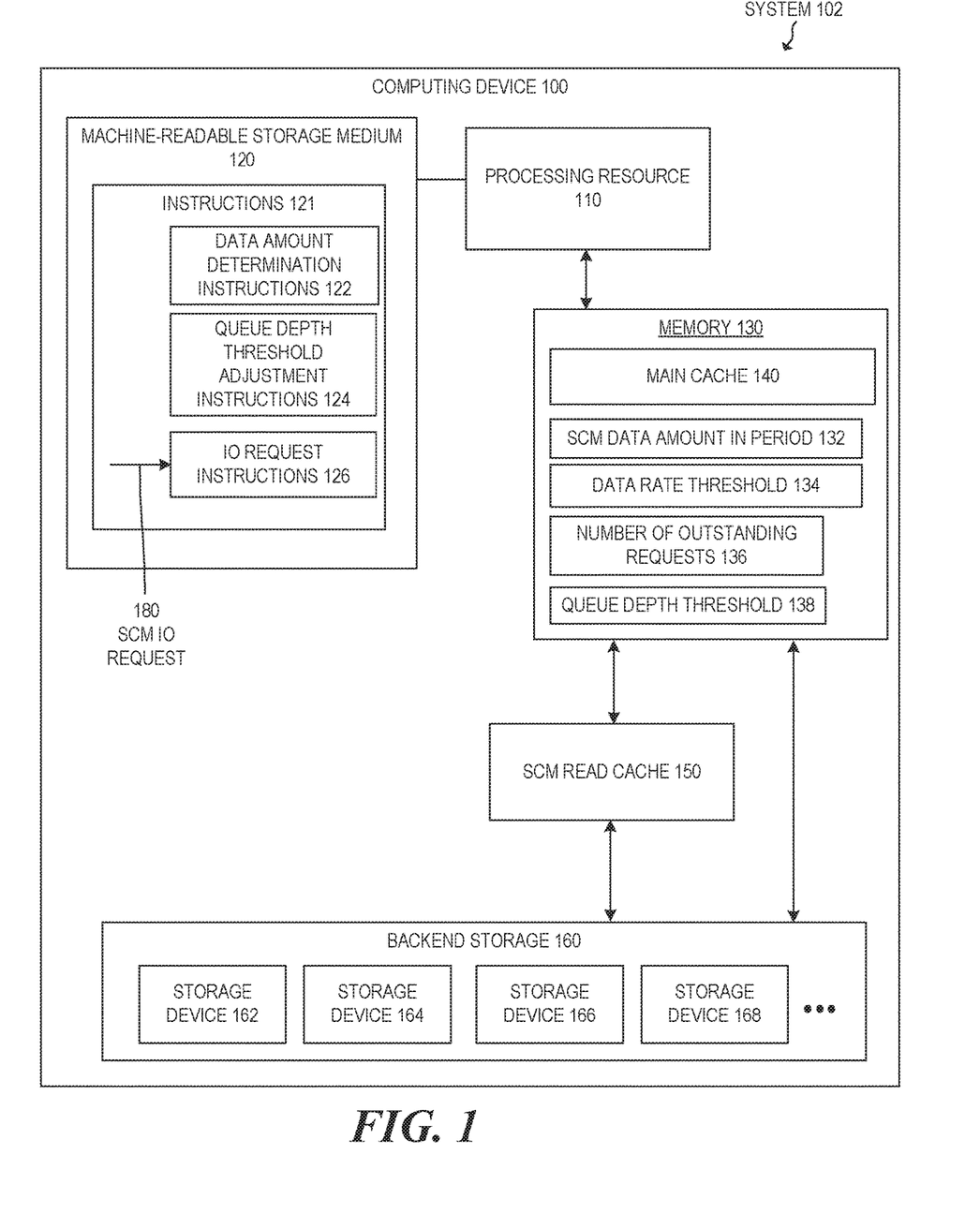
FIG. 1 is a block diagram of an example computing system to select whether to use a storage class memory (SCM) read cache based on a queue depth threshold.

FIG. 1 is a block diagram of an example computing system 102 to select whether to use a storage class memory (SCM) read cache 150 based on a queue depth threshold. In the example illustrated in FIG. 1, computing system 102 (or "system" or "storage system" 102) includes a computing device 100 comprising at least one processing resource 110 and at least one machine-readable storage medium 120 comprising (e.g., encoded with) at least storage instructions 121 that are executable by the at least one processing resource 110 of computing device 101 to implement functionalities described herein in relation to instructions 121. Instructions 121 may include at least instructions 122, 124, and 126, which may be executable by the at least one processing resource 110. Computing device 100 may be any suitable type of computing device as described herein, such as a server, a storage array, or the like.

In the example illustrated in FIG. 1, computing device 100 may comprise memory 130, which may be implemented by volatile memory (e.g., one or more volatile memory devices, such as DRAM device(s), DIMM(s), or the like). Memory 130 may implement main cache 140 of computing device 100 for use by processing resource 110. In some examples, memory 130 may also store various data 132, 134, 136, and 138 used by instructions 121 as described below. In some examples, data 132, 134, 136, and 138 may be stored on the same memory device or device(s) that implement main cache 140. In other examples, data 132, 134, 136, and 138 may be stored on a different memory device or device(s) than the memory device or device(s) that implement main cache 140.

In the example illustrated in FIG. 1, computing device 100 may comprise backend storage 160 to persistently store data for computing device 100. Backend storage 160 may comprise one or more storage devices, such as storage devices 162, 164, 166, 168, etc. Each of the storage device(s) of backend storage 160 may be a non-volatile storage device, such as a HDD, a SSD, or the like, and backend storage 160 may comprise any combination of such non-volatile storage devices. In some examples, computing device 100 may be a storage array comprising a plurality of storage devices to store data (e.g., the storage devices of backend storage 160). Although four storage devices are illustrated in backend storage 160 in the example of FIG. 1, in examples, backend storage 160 may include any suitable number of one or more storage devices (e.g., more than four, etc.).

In the example illustrated in FIG. 1, computing device 100 may comprise an SCM read cache 150 implemented by an SCM device (or SCM chip) including SCM to store data. In examples described herein, computing device 100 may utilize the SCM read cache 150 as an extended read cache to extend the capacity of main cache 140 for servicing read requests. SCM read cache 150 may also be logically (or functionally) between main cache 140 and backend storage 160 and may be referred to as an "intermediate" read cache herein. In such examples, SCM read cache 150 may be logically (or functionally) between main cache 140 and backend storage 160 in that, for example, data may be flushed or destaged from the main cache 140 into SCM read cache 150 such that the data may subsequently be read back into main cache 140 from the SCM read cache 150 to avoid the higher latency process of reading the data into main cache 140 from backend storage 160.

In examples described herein, SCM may be a type of non-volatile memory (NVM) technology and may communicate using a protocol consistent with NVM Express™ (NVMe™). In examples described herein, an SCM device to implement (at least in part) the SCM read cache 150 may be implemented in any one of a plurality of different forms, such as, for example, a 3D XPoint chip (or device), a 3D XPoint DIMM, Phase Change Memory (PCM) device (such as Phase-Change random-access memory (RAM) device), a Magnetic RAM (MRAM) device (such as Spin-Torque-Transfer (STT) RAM device), a Resistive RAM (RRAM)

device, a memristor device, or the like, or a combination thereof. In some examples, the SCM may implement block-based access. In other examples, SCM may implement memory-based semantics for data access. In such examples, SCM-based DIMMs may be used to implement SCM read cache herein. In some examples, one or more storage devices of backend storage 160 may communicate using a protocol consistent with NVMe™. In examples described herein, SCM read cache 150 may comprise a read cache implemented by an SCM device having lower latency than a SAS SSD (which is a type of NVM.

Figure 2:
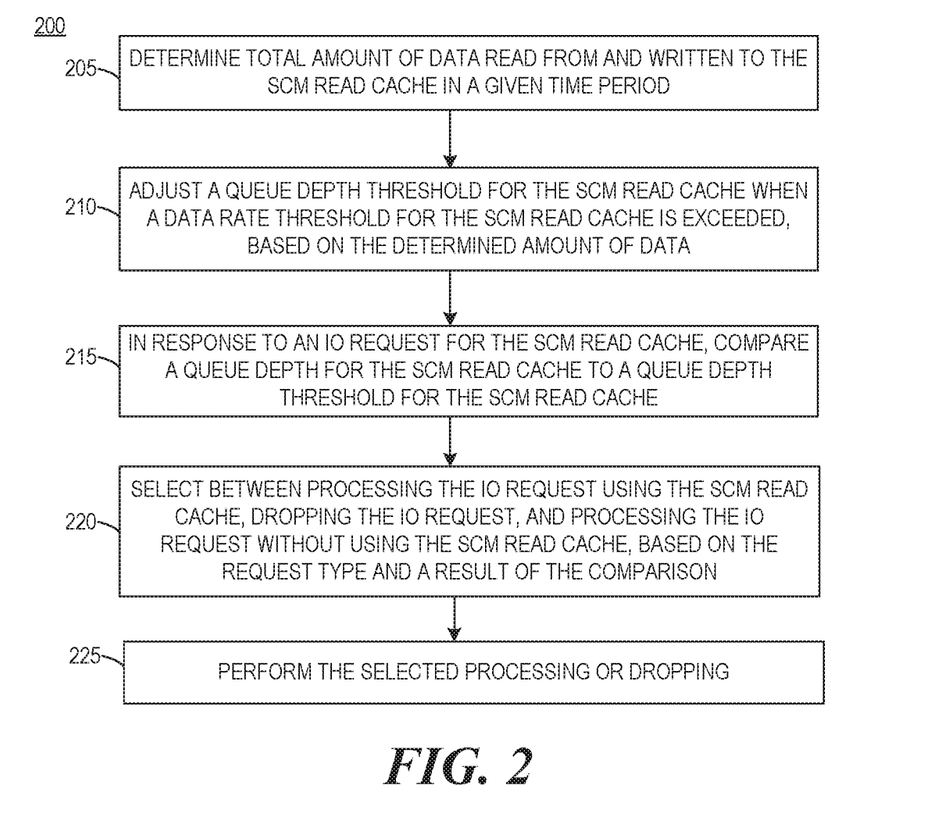
FIG. 2 is a flowchart of an example method that includes comparing a number of outstanding IOs to a queue depth threshold for the SCM read cache.

Examples will now be described herein in relation to FIGS. 1 and 2, where FIG. 2 is a flowchart of an example method 200 that includes comparing a number of outstanding IOs to a queue depth threshold for the SCM read cache 150. Although execution of method 200 is described below with reference to computing device 100 of FIG. 1, other computing devices suitable for the execution of method 200 may be utilized (e.g., computing device 500 of FIG. 5). Additionally, implementation of method 200 is not limited to such examples. Although the flowchart of FIG. 2 shows a specific order of performance of certain functionalities, method 200 is not limited to that order. For example, the functionalities shown in succession in the flowchart may be performed in a different order, may be executed concurrently or with partial concurrence, or a combination thereof.

Referring to FIGS. 1 and 2, at 205 of method 200, instructions 122 of computing device 100 may (e.g., when executed by processing resource 110) determine a total amount of data 132 read from and written to SCM read cache 150 in a given time period (e.g., using processing resource 110). In some examples, instructions 122 may determine this total amount of data 132 based on accumulating the amount of data read from or written to SCM read cache 150 by IO requests for SCM read cache 150 completed in the given time period, as described in more detail below in relation to FIG. 3A.

At 210, instructions 124 may (e.g., when executed by processing resource 110) adjust at least one queue depth threshold 138 for SCM read cache 150 in response to a determination that a data rate threshold 134 for SCM read cache 150 is exceeded, based on the determined amount of data 132. For example, instructions 124 may decrease at least one of the queue depth threshold(s) when the determined total amount of data 132 is greater than data rate threshold 134 and may increase at least one of the queue depth threshold(s) when the determined total amount of data 132 is not greater (i.e., less than or equal to) than the data rate threshold 134, as described in more detail below in relation to FIGS. 3A-3C.

In some examples, data rate threshold 134 and the determined amount of data 132 may be expressed or represented in the same terms (e.g., an amount of data) and, in such examples, instructions 124 may compare these values directly to make the above described determination. In other examples, data rate threshold 134 may be expressed or represented in different terms (e.g., a rate of data/unit of time) than determined amount of data 132 (e.g., an amount of data) and, in such examples, instructions 124 may first put both values in equivalent terms (e.g., by converting one or both of the values) before comparing them.

In examples described herein, the "queue depth" for an SCM read cache at a given time may be a number of IO requests (or IOs) outstanding at the given time (e.g., issued to the SCM read cache and not yet been completed or reported as completed by the SCM read cache at the given time). In examples described herein, a "queue depth threshold" for an SCM read cache may be an adjustable threshold related to (e.g., set for) a queue depth of the SCM read cache. In some examples described herein, a queue depth may refer to a read queue depth or a write queue depth, for example. In such examples, "read queue depth" for an SCM read cache at a given time may be a total number of read requests issued to the SCM read cache that are outstanding at the given time (i.e., issued to the SCM read cache and not yet completed or reported as completed at the given time). In examples described herein, a "write queue depth" for an SCM read cache at a given time may be the total number of write requests (e.g., destage requests) issued to the SCM read cache that are outstanding at the given time (i.e., issued to the SCM read cache and not yet completed or reported as completed at the given time). In such examples, a queue depth threshold may refer to a read queue depth threshold or a write queue depth threshold, for example. In such examples, a "read queue depth threshold" for an SCM read cache may be an adjustable threshold related to (e.g., set for) the read queue depth of the SCM read cache, and a "write queue depth threshold" for an SCM read cache may be an adjustable threshold related to (e.g., set for) the write queue depth of the SCM read cache.

In some examples, instructions 121 may implement a single queue depth threshold 138 for SCM read cache 150, and instructions 124 may adjust the single queue depth threshold 138. In other examples, instructions 121 may implement a plurality of queue depth thresholds for SCM read cache 150, such as the above-described read queue depth threshold and write queue depth threshold for SCM read cache 150 (see, e.g., read and write queue depth thresholds 137 and 139 of FIG. 5). In such examples, instructions 124 may selectively adjust one of those thresholds at a time (as described in more detail below in relation to FIGS. 3B and 3C). In such examples, instructions 124 may adjust the read and write queue depth thresholds in a staged manner. In other examples, instructions 124 may adjust the read and write queue depth thresholds uniformly (e.g., adjust both in the same direction at the same time to maintain them at the same value).

In some examples, the read queue depth threshold may be a threshold to which a current read queue depth for the SCM read cache 150 may be compared in response to a read request 180 to read requested data from the SCM read cache 150. In some examples, the write queue depth threshold may be a threshold to which a current write queue depth for the SCM read cache 150 may be compared in response to a destage request to write clean data from main cache 140 to the SCM read cache 150. In examples in which there is a single queue depth threshold, a current queue depth of the SCM read cache 150 (e.g., the read queue depth, the write queue depth, or combination of the two) may be compared to the single queue depth threshold in response to either the above-described read request or destage request. In examples described herein, a "current" queue depth (e.g., read or write queue depth) of a SCM read cache (or "current" number of read or write (destage) IOs outstanding for the SCM read cache) may be the value of that queue depth (or that number of outstanding IOs) for the SCM read cache at the time that the value is checked or determined in response to an IO request (which may be a "current" time in examples described herein).

Figure 4:
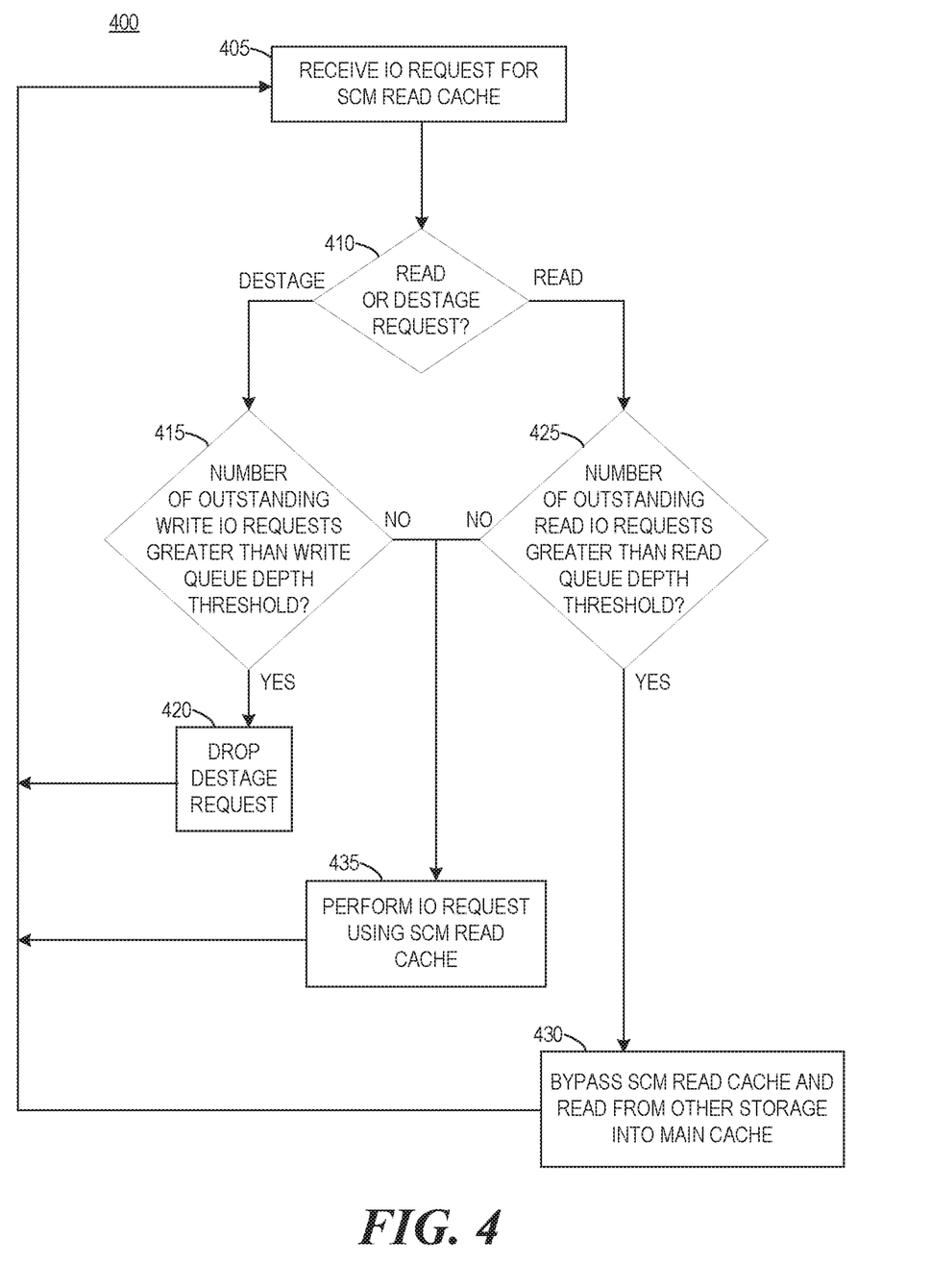
FIG. 4 is a flowchart of an example method that includes selecting whether to process an input/output (IO) request using an SCM read cache.

At 215 of method 200, instructions 126 may (e.g., when executed by processing resource 110) receive an IO request 180 for SCM read cache 150 (e.g., a read request to read data from or a destage request to write data from main cache 140 to SCM read cache 150) and, in response to the IO request 180, determine a type of the IO request 180 (e.g., a read request or a destage request) and compare a current number 136 of IOs outstanding for SCM read cache 150 (e.g., outstanding read or write IOs) to one of the queue depth threshold(s) 138 for SCM read cache 150 (as described in more detail below in relation to FIG. 4). In some examples, the number of outstanding requests 136 may actually include two values: (i) a number of outstanding read IOs for SCM read cache 150 and (ii) a number of outstanding write IOs for SCM read cache 150 (see, e.g., read IOs outstanding 133 and write IOs outstanding 135 of FIG. 5). In such examples, in response to IO request 180, instructions 126 may determine the type of IO request 180, and when IO request 180 is a read request, instructions 126 may compare the current number of read IOs outstanding for SCM read cache 150 to a read queue depth threshold for SCM read cache 150 (as described in more detail below in relation to FIG. 4). In other examples, when IO request 180 is a destage request, instructions 126 may compare the current number of write IOs outstanding for SCM read cache 150 to a write queue depth threshold for SCM read cache 150 (as described in more detail below in relation to FIG. 4).

Figure 5:
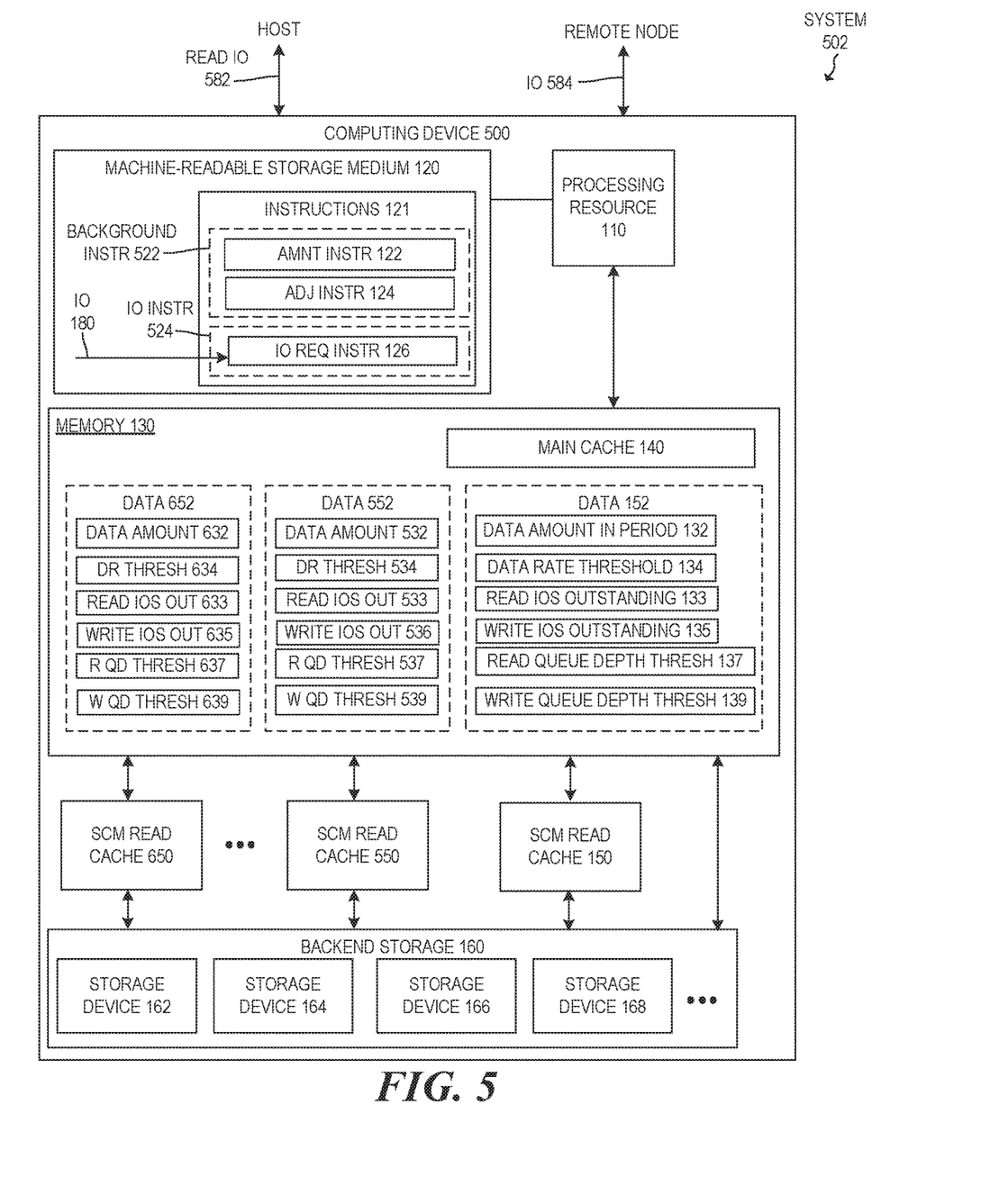
FIG. 5 is a block diagram of an example system to adjust queue depth thresholds for each of a plurality of SCM caches.

In examples described herein, the types of IO requests (or IOs) for SCM read cache 150 may include read requests and destage requests. In some examples, read requests may be requests to read certain requested data from the SCM read cache based on host IO requests, and destage request may be destage requests generated by the computing device including the SCM read cache (i.e., internally generated by the computing device itself and not host IO). In such examples, a host may be any suitable computing device able to communicate with the computing device via one or more computer network(s). Referring to FIG. 5, for example, a computing device 500 (as described below) may receive a read request (or read IO) 582 from a host computing device separate from computing device 500 via one or more computer network(s). In some examples, such a host read request 582 for certain requested data may trigger a read request 180 for an SCM read cache to read (at least some of) the requested data (e.g., when the data requested in the read request 582 is not present in main cache 140 but is present in the SCM read cache). A read request 180 for SCM read cache 150 of computing device 100 of FIG. 1 (i.e., to read certain requested data) may similarly be triggered by a read request for the requested data from a host computing device separate from computing device 100. In contrast, a destage request 180 in examples described herein may be internally generated by the computing device (e.g., computing device 100) including the SCM read cache 150, for example, when the computing device determines that the main cache 140 is too full and decides to destage clean data from main cache 140 to SCM read cache 150. In examples described herein, a computer network may include, for example, a local area network (LAN), a virtual LAN (VLAN), a wireless local area network (WLAN), a virtual private network (VPN), the Internet, or the like, or a combination thereof.

Returning to FIG. 2, at 220, instructions 126 may (e.g., when executed by processing resource 110), based on a type of the IO request 180 and a result of the comparison, select between (1) processing IO request 180 using SCM read cache 150, (2) dropping IO request 180 (i.e., without performing IO request 180), and (3) processing the IO request 180 without using SCM read cache 150. In response to the selection, instructions 126 may perform the selected processing or dropping of IO request 180 (as described in more detail below in relation to FIG. 4).

For example, based on (i) a determination that IO request 180 is a request to destage data to SCM read cache 150 and (ii) the result of the comparison indicating that the current number of write IOs outstanding for SCM read cache 150 is greater than the write queue depth threshold for SCM read cache 150, instructions 126 may select to drop IO request 180 and in response may perform the selection (at 225 of method 200), including dropping IO request 180 without writing the data (of the destage request) to SCM read cache 150 (and without writing the data to backend storage 160 or storage of another remote computing device, for example).

In examples described herein, a request to destage data to SCM read cache 150 is a request to destage clean data from main cache 140 to SCM read cache 150. In examples described herein, "clean" data in main cache 140 is data that has not been changed in main cache 140 since it was brought into main cache 140 from backend storage 160. When data is first read into main cache 140, it is read from backend storage 160. So, if that data is "clean" data in main cache 140 (e.g., unchanged since it was read into main cache 140 from backend storage 160), then a copy of the clean data still exists in backend storage 160 at the time of the destage request. In contrast, in examples described herein, "dirty" data is data that is not present in backend storage 160 because, for example, the data was modified while in main cache 140 (after it was brought in from backend storage 160) and has not been flushed back to backend storage 160 with the changes.

In such examples, dropping a flush request of dirty data might risk losing data (e.g., the changes to the data). However, in examples described herein, the destage request relates to destaging clean data from main cache 140 to SCM read cache 150 and, as noted above, the clean data is already present in backend storage 160, so dropping the destage request would not likely result in any data loss.

In examples described herein, a destage request may be received when computing device 100 has determined that main cache 140 is too full and space needs to be freed in main cache 140 (e.g., by destaging the least recently used data, or the like). In such examples, the clean data may be destaged from main cache 140 to SCM read cache 150 where it may be held for later reading from SCM read cache 150 with lower latency than if it were to be read from backend storage 160 at the later time. While destaging to SCM read cache 150 may save time on a later re-read of the data, the potential future savings may not be worth the additional load on the SCM read cache 150 to write to SCM read cache 150 to perform the destage. For example, when the SCM read cache 150 has recently been processing data at, above, or near data rate threshold 134, the additional load of processing the destage request may exceed data rate threshold 134 and cause later IOs to execute with much higher latency than if data rate threshold 134 were not exceeded, for example. As such, it may be preferable to drop the destage request in some circumstances.

As such, in examples described herein, instructions 124 may adjust the write queue depth threshold for SCM read cache 150 based on the amount of data read from and written to SCM read cache 150 (as described above in relation to instructions 122). In such examples, instructions 126 may select to drop the destage request when the current write queue depth of SCM read cache 150 is greater than the current write queue depth threshold for SCM read cache 150 to avoid overloading the SCM read cache 150 and potentially causing much higher latency for later IOs. In such examples, when the destage request is dropped, the clean data that was to be destaged from main cache 140 may be freed in main cache 140 without being written elsewhere (e.g., SCM read cache 150 or backend storage 160).

Returning to 220 of FIG. 2, instructions 126 may make an alternative selection when different criteria are met. For example, based on (i) a determination that IO request 180 is a read request for requested data and (ii) the result of the comparison indicating that the current number of read IOs outstanding for SCM read cache 150 is greater than a read queue depth threshold for SCM read cache 150, instructions 126 may select to process IO request 180 without using SCM read cache 150. In response, instructions 126 may perform the selection, including bypassing SCM read cache 150 and reading the requested data into main cache 140 from other storage (e.g., directly from backend storage 160 or from storage of a remote computing device or "node" herein). In other examples, instructions 126 make further determinations (e.g., based on location and utilization of other storage from which the requested data would be read) and decide whether to bypass SCM read cache 150 based in part on those further determination as well.

In such examples, while reading from SCM read cache 150 may have lower latency than reading from backend storage 160 (as described above), when the data rate experienced by SCM read cache 150 exceeds data rate threshold 134, then subsequent IOs to the SCM read cache may experience significantly higher latencies, as described above. As such, instructions 126 may bypass SCM read cache 150 and read directly from backend storage 160 when a current queue depth threshold 138 for SCM read cache 150 (e.g., a read queue depth threshold) is exceeded by the current queue depth 136 for SCM read cache 150, where that queue depth threshold 138 is adjusted based on the data rate experienced by SCM read cache 150, as described above. In such examples, controlling the queue depth threshold and selectively bypassing the SCM read cache 150 based on that threshold may beneficially maintain the data rate experienced by SCM read cache 150 below data rate threshold 134.

Returning to 220 of FIG. 2, instructions 126 may make yet another selection when different criteria are met. For example, based on (i) a determination that IO request 180 is a request to destage data to SCM read cache 150 and (ii) a result of the comparison indicating that the current number of write IOs outstanding for SCM read cache 150 is not greater than a write queue depth threshold for SCM read cache 150, instructions 126 may select to process IO request 180 using SCM read cache 150, and in response destage (e.g., write) the data to SCM read cache 150.

In some examples, instructions 126 may make yet another selection when different criteria are met. For example, based on (i) a determination that IO request 180 is a read request to read requested data from SCM read cache 150 and (ii) a result of the comparison indicating that the current number of read IOs outstanding for SCM read cache 150 is not greater than a read queue depth threshold for SCM read cache 150, instructions 126 may select to process IO request 180 using SCM read cache 150, and in response read the requested data from SMC read cache 150 into main cache 140.

Figure 3A:
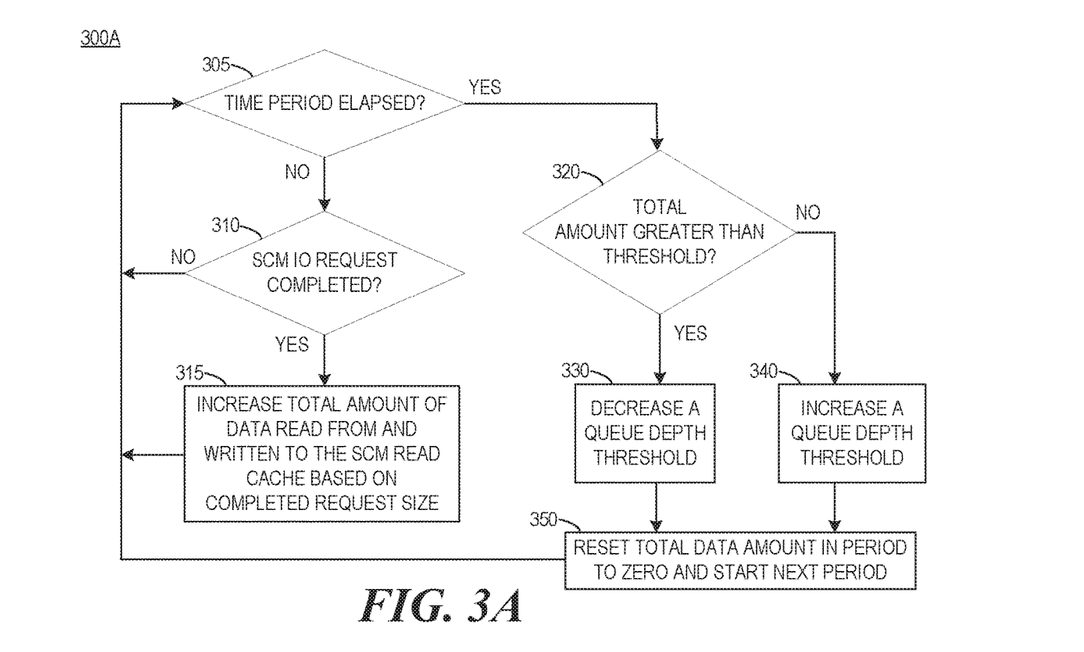
FIG. 3A is a flowchart of an example method that includes adjusting a queue depth threshold based on an amount of data transferred to and from an SCM read cache in a time period.
Figure 3B:
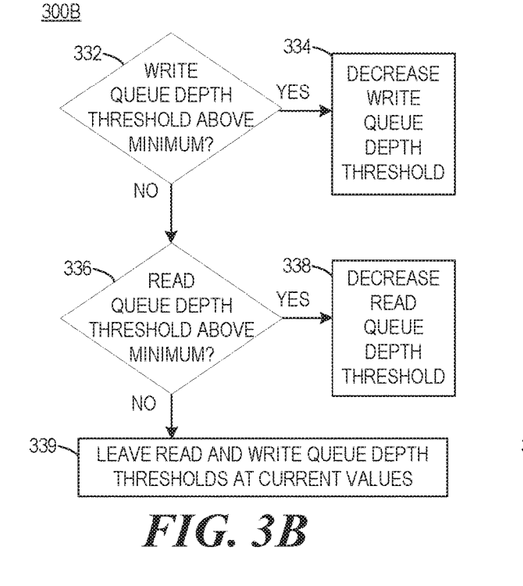
FIG. 3B is a flowchart of an example method that includes decreasing one of a write queue depth threshold and a read queue depth threshold for an SCM read cache.
Figure 3C:
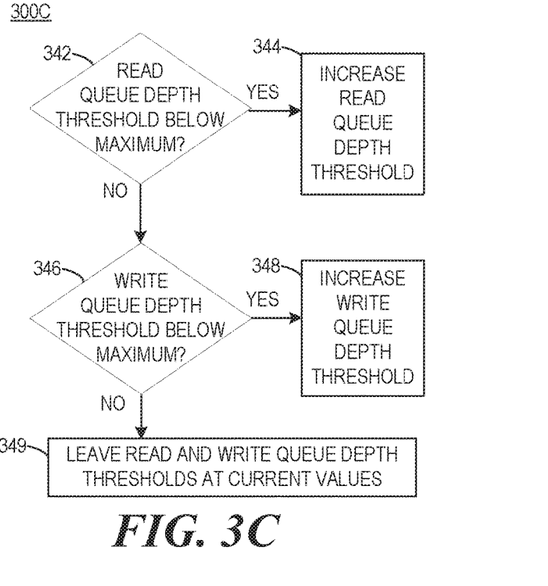
FIG. 3C is a flowchart of an example method that includes increasing one of a write queue depth threshold and a read queue depth threshold for an SCM read cache.

Examples described above in relation to method 200 of FIG. 2 will now be described below in more detail in relation to the examples of FIGS. 3A, 3B, 3C, and 4. FIG. 3A is a flowchart of an example method 300A that includes adjusting a queue depth threshold based on an amount of data transferred to and from an SCM read cache in a time period. FIG. 3B is a flowchart of an example method 300B that includes decreasing one of a write queue depth threshold and a read queue depth threshold for an SCM read cache. FIG. 3C is a flowchart of an example method 300C that includes increasing one of a write queue depth threshold and a read queue depth threshold for an SCM read cache. FIG. 4 is a flowchart of an example method 400 that includes selecting whether to process an input/output (IO) request using an SCM read cache.

Although execution of methods 300A, 300B, 300C, and 400 are described below with reference to computing device 100 of FIG. 1, other computing devices suitable for the execution of these methods may be utilized (e.g., computing device 500 of FIG. 5). Additionally, implementation of these methods is not limited to such examples. Although the flowcharts of FIGS. 3A-4 each show a specific order of performance of certain functionalities, the methods are not limited to that order. For example, the functionalities shown in succession in the flowcharts may be performed in a different order, may be executed concurrently or with partial concurrence, or a combination thereof.

Referring to FIGS. 1 and 2, as described above, instructions 122 may determine a total amount of data 132 read from and written to SCM read cache 150 in a given time period (at 205 of method 200), and instructions 124 may adjust at least one queue depth threshold 138 for SCM read cache 150 in response to a determination, based on the determined amount of data 132, that data rate threshold 134 for SCM read cache 150 is exceeded (at 210 of method 200). In some examples, these functionalities may be performed periodically by a background process (or thread) implemented, at least in part, by instructions 122 and 124 in some examples (see, e.g., background instructions 522 of FIG. 5 to implement the background process).

Functionalities described above in relation to 205 and 210 of FIG. 2 may be described in more detail below in relation to FIGS. 3A-3C. Referring to FIG. 3A, method 300A may start at 305, where instructions 122 may determine whether a time period has elapsed. For example, as noted above, the background process may periodically perform determining the total amount of data 132 and selectively adjusting the queue depth threshold(s).

In the example of FIG. 3A, the determination and selective adjustment may be performed at the end of each of a plurality of successive time periods. Such time periods may each be a fixed amount of time such as, for example, around 100 milliseconds. In such examples, during each of the time periods (i.e., while the time period has not elapsed), instructions 122 may accumulate the total amount of data 132 read from and written to SCM read cache 150 during the time period by, for example, upon completion of each IO for SCM read cache 150 accumulating the amount of data read or written by the completed IO. For example, if the current time period has not elapsed ("NO" at 305), method 300A may proceed to 310, where instructions 122 may determine whether any outstanding IO requests for SCM read cache 150 have completed. If so ("YES" at 310), then instructions 122 may increase the total amount of data read from and written to SCM read cache 150 in the current time period based on the size of the completed IO request (i.e., the amount of data read or written by the IO). For example, at 315, for each completed IO for SCM read cache 150, instructions 122 may add, to a running total for the current time period, the amount of data read and/or written by the recently completed IO request(s) for SCM read cache 150. After appropriately increasing the total amount of data 132 at 315, instructions 122 may return to 305 (e.g., to determine whether the current time period has elapsed). If no outstanding IOs for SCM read cache 150 have completed at 310

("NO" at 310), then instructions 122 may return to 305 (e.g., to determine whether the current time period has elapsed).

At 305, when the current time period has elapsed (e.g., at the end of the current 100 ms time period) ("YES" at 305), method 300A may proceed to 320 where instructions 122 may determine the total amount of data 132 read from and written to SCM read cache 150 in the elapsed time period (e.g., the most recent 100 ms time period) by, for example, examining the total amount of data accumulated over the elapsed time period, as described above. At 320, instructions 122 may further determine whether data rate threshold 134 for SCM read cache 150 is exceeded in the time period based on the accumulated total amount of data 132 for the time period (as described above in relation to FIGS. 1 and 2), and based on the determination, instructions 124 may adjust at least one queue depth threshold for SCM read cache 150.

For example, if instructions 122 determine that data rate threshold 134 is exceeded in the time period based on the accumulated total amount of data 132 ("YES" at 320), then instructions 124 may decrease at least one queue depth threshold for SCM read cache 150 (e.g., as described in more detail in relation to FIG. 3B for an example in which there are multiple queue depth thresholds). Instructions 122 may then, at 350, reset the total amount of data 132 for the time period to zero (in preparation for the next time period) and start the next time period and/or begin (at 305) to perform method 300A of FIG. 3A again for the next time period (e.g., the next 100 ms time period).

In other examples, if instructions 122 determine that data rate threshold 134 is not exceeded in the time period based on the accumulated total amount of data 132 ("NO" at 320), then instructions 124 may increase at least one queue depth threshold for SCM read cache 150 (e.g., as described in more detail in relation to FIG. 3C for an example in which there are multiple queue depth thresholds). Instructions 122 may then, at 350, reset the total amount of data 132 for the time period to zero (in preparation for the next time period) and start the next time period and/or begin (at 305) to perform method 300A of FIG. 3A again for the next time period (e.g., the next 100 ms time period).

In some examples, computing device 100 may be executing multiple different threads that may be reading from and writing to SCM read cache 150 (e.g., one or more read threads and one destage thread). In such examples, instructions 122 to determine the total amount of data transferred to/from SCM read cache 150 in the time period may represent the total amount of data read/written by all of those threads for the time period (e.g., by basing the accumulated total on the size of each IO completed by SCM read cache 150).

In examples described herein, by repeatedly measuring the total amount of data 132 read from and written to SCM read cache 150 in a fixed interval of time, instructions 122 may take periodic samples of the rate of data transfer to and from SCM read cache 150 in the most recent period of time (e.g., which may be the total amount of data 132 in the time period divided by the length of the time period). By taking those periodic samples representing the data rate experienced by SCM read cache 150, instructions 122 may collect a useful measure of whether the data rate threshold 134 was exceeded in the prior time period.

Although examples are described herein in the context of a 100 ms time period, other suitable time periods may be utilized. In the examples described herein, there may be a tradeoff between having shorter intervals (e.g., 10 ms, which may provide more frequent feedback on the recently observed rate of data transfer but may also consume more resources) and having longer intervals (e.g., 1 second, which may consumer fewer resource, but may also provide less frequent feedback and be more susceptible to distortion by temporary bursts of data transfers). While 100 ms may be a suitable compromise between these competing concerns in some examples, in other examples, other time periods may be more suitable, particularly as the performance capabilities of computing device resources increase.

Referring again to FIG. 3A, in examples in which there is one queue depth threshold 138 for SCM read cache 150, instructions 124 may increase that one queue depth threshold 138 at 340 of method 300A, and may decrease that one queue depth threshold 138 at 330 of method 300A. In other examples in which there are multiple queue depth thresholds 138 that are treated the same by instructions 124 (e.g., read and write queue depth thresholds 138), instructions 124 may increase that both such queue depth thresholds 138 at 340 of method 300A, and may decrease both such queue depth thresholds 138 at 330 of method 300A. In other examples, instructions 121 may implement different read and write queue depth thresholds for SCM read cache 150 of computing device 100, as described above, and instructions 124 may adjust them differently. For example, instructions 124 may decrease either the read queue depth threshold or the write queue depth threshold (but not both) at 330, and instructions 124 may increase either the read queue depth threshold or the write queue depth threshold (but not both) at 340.

In some examples, instructions 124 may adjust read and write queue depth thresholds for SCM read cache 150 differently and in a staged manner, as described below in relation to FIGS. 3B and 3C. For example, referring to FIG. 3B, method 300B may be an example method to implement block 330 of method 300A (i.e., decreasing a queue depth threshold) in which read and write queue depth thresholds are adjusted in a staged manner. For example, when instructions 122 determine that the total amount of data 132 read/written in the time period is greater than the data rate threshold 134 ("YES" at 320), instructions 124 may proceed to 332 of method 300B, where instructions 124 may determine whether the write queue depth threshold is above a first minimum value (e.g., zero, or another suitable value). If so ("YES" at 332), then at 334 instructions 124 may decrease the write queue depth threshold, and then proceed to 350 of method 300A (of FIG. 3A). If not ("NO" at 332; i.e., the write queue depth threshold has the first minimum value), then at 336 instructions 124 may determine whether the read queue depth threshold is above a second minimum value (e.g., 10% of a default or maximum value for the read queue depth threshold). If so ("YES" at 336), then instructions 124 may decrease the read queue depth threshold at 338 and then proceed to 350 of method 300A (of FIG. 3A). When the write queue depth threshold also has the first minimum value ("NO" at 336), then instructions 124 may decrease neither the write queue depth threshold nor the read queue depth threshold at 339, and then proceed to 350 of method 300A (of FIG. 3A).

In the example of FIG. 3B, when decreasing different queue depth thresholds in a staged manner, instructions 124 may first decrease the write queue depth threshold until a minimum value is reached (e.g., 0, or another suitable minimum value), and begin to decrease the read queue depth threshold only after the write queue depth threshold has reached the minimum value, and then cease decreasing either queue depth threshold if they both reach their respective minimum values (which may be the same or different). In this manner, examples described herein may prioritize reads from the SCM read cache 150 over writes, such as destage operations to write clean data from main cache 140 to SCM read cache 150. By adjusting the queue depth thresholds in this manner, destage operations may be dropped more aggressively than the SCM read cache 150 is bypassed for read operations. This may be beneficial in some examples because, for example, a present read operation will realize the benefit of the lower latency read from the SCM read cache 150 (over a read from backend storage 160) immediately, while destage operations actually incur the present cost of writing to the SCM read cache 150 in light of the possibility of enabling a lower-latency read from SCM read cache 150 at a later time. As such, it may be beneficial to drop writes more aggressively than bypassing the SCM read cache 150 for reads.

In examples described herein, a queue depth threshold may be increased or decreased by any suitable amount, such as a fixed amount, a proportional amount (e.g., 10% of the current value of the queue depth threshold), or any other suitable fixed or variable amount.

Referring now to FIG. 3C, method 300C may be an example method to implement block 340 of method 300A (i.e., increasing a queue depth threshold) in which read and write queue depth thresholds are adjusted in a staged manner. For example, when instructions 122 determine that the total amount of data 132 read/written in the time period is not greater than the data rate threshold 134 ("NO" at 320), instructions 124 may proceed to 342 of method 300C, where instructions 124 may determine whether the read queue depth threshold is below a first maximum value (e.g., a default value for the read queue depth threshold, such as 100, 500, or any other suitable value). If so ("YES" at 342), instructions 124 may increase the read queue depth threshold and then proceed to 350 of method 300A (of FIG. 3A). If not ("NO" at 342; i.e., the read queue depth threshold has the first maximum value), instructions 124 may determine, at 346, whether the write queue depth threshold is below a second maximum value, which may be the same as or different than the first maximum value (e.g., a default value for the write queue depth threshold, such as 100, 500, or any other suitable value). If so ("YES" at 346), instructions 124 may increase the write queue depth threshold and then proceed to 350 of method 300A (of FIG. 3A). If not ("NO" at 346; i.e., the write queue depth threshold has the second maximum value), instructions 124 may determine to increase neither the read queue depth threshold nor the write queue depth threshold.

In the example of FIG. 3C, when increasing different queue depth thresholds in a staged manner, instructions 124 may first increase the read queue depth threshold until a first maximum value is reached, and begin to increase the write queue depth threshold only after the read queue depth threshold has reached the first maximum value, and then cease increasing either of the queue depth thresholds if they both reach their respective maximum values (which may be the same or different). In this manner, examples described herein may prioritize reads from the SCM read cache 150 over writes (e.g., destage operations), at least for reasons similar to those described above in relation to FIG. 3B.

Referring again to FIGS. 1 and 2, as described above, instructions 126 may receive an IO request 180 for SCM read cache 150 and in response determine a type of the IO request 180 and compare the current number 136 of IOs outstanding for SCM read cache 150 to one of the queue depth threshold(s) 138 for SCM read cache 150 (at 215 of method 200). In such examples, instructions 126 may also, based on the type of the IO request 180 and the result of the comparison, select between (1) processing IO request 180 using SCM read cache 150, (2) dropping IO request 180, and (3) processing the IO request 180 without using SCM read cache 150, and perform the selection (at 220 of method 200), as described above. In some examples, these functionalities may be performed by an IO process (or thread) different than the above-described background process (or thread), wherein the IO process is implemented, at least in part, by instructions 126 in some examples (see, e.g., IO instructions 524 of FIG. 5 to implement the IO process). The IO process may be, for example, a process to implement adaptive caching of data in computing device 100.

Functionalities described above in relation to 215, 220, and 225 of FIG. 2 may be described in more detail below in relation to FIGS. 1 and 4. Referring to FIG. 4, method 400 may start at 405, where instructions 126 may receive an IO request 180 for SCM read cache 150. At 410, instructions 126 may determine whether the IO request 180 is a read request or a destage request. In response to a determination that the IO request 180 is a read request for requested data ("READ" at 410), instructions 126 may determine at 425 whether a current number of read IOs outstanding for SCM read cache 150 is greater than a read queue depth threshold for SCM read cache 150. If so ("YES" at 425), then at 430 instructions 126 may bypass SCM read cache 150 and read the requested data from backend storage 160 (or other storage, such as storage device(s) of a remote node or array) into main cache 140 (and without reading the requested data from the SCM read cache 150), as described above, and then proceed to 405 to await a subsequent IO request for SCM read cache 150. In other examples, further determination(s) may be made at 430 before deciding whether to proceed with bypassing SCM read cache 150 and reading the requested data from other storage (e.g., backend storage 160), as described in more detail below. If the current number of read IOs outstanding for SCM read cache 150 is not greater than the read queue depth threshold ("NO" at 425), then at 435, instructions 126 may perform the IO request 180 using SCM read cache 150, which in this example may include reading the requested data (of the read request 180) from SCM read cache 150 into main cache 140. As described above, the read request 180 for requested data may be triggered by a host read IO (e.g., a read request from a host computing device separate from computing device 100 for at least the requested data).

Returning to 410 of method 400, in response to a determination that the IO request 180 is a destage request ("DESTAGE" at 410), instructions 126 may determine at 415 whether a current number of write IOs outstanding for SCM read cache 150 is greater than a write queue depth threshold for SCM read cache 150. If so ("YES" at 415), then at 420 instructions 126 may drop the IO request 180 (i.e., the destage request 180), as described above, skip destaging the data from main cache 140 to SCM read cache 150 and then proceed to 405 to await a subsequent IO request for SCM read cache 150. If not ("NO" at 415), then at 435, instructions 126 may perform the IO request 180 using SCM read cache 150, which in this example may include destaging data from main cache 140 to SCM read cache 150, including writing the data associated with the destage request to SCM read cache 150, and then proceed to 405 to await a subsequent IO request for SCM read cache 150. As described above, a destage request 180 may be a request, generated internally by computing device 100, to destage clean data from main cache 140 into SCM read cache 150.

In examples described herein, instructions 126 may maintain the number 136 of outstanding IOs to SCM read cache 150, which may actually be represented as two numbers, including a number of outstanding read IOs for SCM read cache 150 and a number of outstanding write IOs for SCM read cache 150. In such examples, instructions 126 may maintain these numbers by, for example, increasing the number of outstanding read IOs each time a read IO request is issued to the SCM read cache 150 (e.g., to a device driver for an SCM device implementing the SCM read cache 150), and decreasing that number each time one of the read IO requests to SCM read cache 150 is completed (e.g., reported as being completed). Similarly, instructions 126 may increase the number of outstanding write IOs each time a write IO request is issued to the SCM read cache 150 (e.g., to a device driver for an SCM device implementing the SCM read cache 150), and decrease that number each time one of the write IO requests to SCM read cache 150 is completed (e.g., reported as being completed). In other examples, instructions 126 may determine these numbers in any other suitable manner. In some examples described herein, comparison of a current number of outstanding read or write IOs for the SCM read cache 150 (e.g., the current queue depth 136) to a respective queue depth threshold may be triggered by (e.g., performed in response to) receiving an IO request 180 (e.g., a read or destage request) for the SCM read cache 150. In such examples, the IO request 180 may be received by the IO process or thread performing the method of FIG. 4 (e.g., the process or thread implemented by IO instructions 524 of the example of FIG. 5, including instructions 126, as described above).

In other examples, the IO process (or thread) itself (e.g., instructions 126) may periodically determine whether main cache 140 is too full (e.g., has too little free space) and determine to trigger destaging of page(s) (e.g., least recently used page(s)) from main cache 140 to SCM read cache 150. In such examples, in response to a determination to destage data from main cache 140 SCM read cache 150, instructions 126 may perform a similar process to that described above in relation to method 400, proceeding from 410. For example, in response to the determination to destage data, instructions 126 may destage the data from main cache 140 to SCM read cache 150 (at 435) when the current number of write IOs outstanding for SCM read cache 150 is not greater than a write queue depth threshold for SCM read cache 150. In other examples, in response to the determination to destage data, instructions 126 may skip destaging the data from main cache 140 to SCM read cache 150 (e.g., similar to 420) when the current number of write IOs outstanding for SCM read cache 150 is greater than the write queue depth threshold for SCM read cache 150.

In some examples, it may be more beneficial to read from SCM read cache 150, rather than from backend storage 160 or a remote node (e.g., another storage array), even when instructions 126 determine that the number of outstanding read IOs for the SCM read cache 150 is greater than the read queue depth threshold. In such examples, this may depend on various factors related to the storage device(s) that the requested data would be read from if SCM read cache 150 were bypassed. For example, it may be acceptable to bypass SCM read cache 150 when the requested data would then be read from storage device(s) local to the computing device (e.g., computing device 100) including SCM read cache 150, such as storage device(s) of backend storage 160, and those storage device(s) have relatively low utilization. However, it may be more beneficial to proceed with reading the requested data from SCM read cache 150, even when the read queue depth threshold for SCM read cache 150 is exceeded, when, for example, the requested data would otherwise be read from a remote node (e.g., a remote computing device, such as another storage array) or from storage device(s) with relatively high utilization. As such, some examples herein may make further determinations before deciding whether to bypass SCM read cache 150 for a read request 180 when the read queue depth threshold is exceeded.

For example, in response to a read request 180 for SCM read cache 150 (e.g., "READ" at 410 of FIG. 4) and a determination that the current number of read IOs outstanding for SCM read cache 150 is greater than a read queue depth threshold for SCM read cache 150 ("YES" at 425), instructions 126 may make further determinations (e.g., at 430) before deciding whether to (i) bypass SCM read cache 150 and read the requested data into main cache 140 from storage other than SCM read cache 150, or (ii) proceed with reading the requested data from SCM read cache 150 into main cache 140, regardless of the exceeded read queue depth threshold. For example, at 430, instructions 126 may make further determinations related to one or more of the location of the other storage from which the requested data would be read if SCM read cache 150 were bypassed, and a current utilization of that other storage. For example, in response to the read request 180 (e.g., "READ" at 410) and the determination that the current number 136 of read IOs outstanding is greater than the read queue depth threshold for SCM read cache 150 ("YES" at 425), at 430, instructions 126 may first determine what other storage device(s) the requested data is to be read from if SCM read cache 150 is bypassed and the location(s) of those other storage device(s). For example, if instructions 126 determine that the other storage device(s) are located in a remote node (see, e.g., "REMOTE NODE" of FIG. 5) such as a computing device, storage array, etc., that is remote from computing device 100, then instructions 126 may decide to read the requested data from SCM read cache 150 regardless of the exceeded read queue depth threshold. In such examples, it may be more beneficial to read the data from the SCM read cache 150 (even though the read queue depth threshold is exceeded) rather than read the requested data from a remote node (e.g., IO 584 of FIG. 5), which may involve significantly higher latency than reading from any local storage device of backend storage 160 of computing device 100. In some examples, when instructions 126 determine that the other storage device(s) are local to computing device 100 (e.g., in backend storage 160), then instructions 126 may further determine a current utilization of those other storage device(s). In such examples, if the current utilization of one or more of those storage device(s) is greater than a utilization threshold, then instructions 126 may decide to proceed with reading the requested data from SCM read cache 150 regardless of the exceeded read queue depth threshold. In such examples, it may be more beneficial to proceed with reading the data from the SCM read cache 150 rather than the other storage device(s), as the relatively high utilization of those storage device(s) may lead to significantly higher latency in the read compared to when the storage device(s) have lower utilization. In other examples, when instructions 126 determine that the other storage device(s) are local to computing device 100 (e.g., in backend storage 160) and have current utilization that is below the threshold, then instructions 126 may decide to proceed with bypassing SCM read cache 150 and read from the other storage device(s) (e.g., of backend storage 160) at 430. In such examples, the location and utilization of the other storage device(s) may be such that it may be more beneficial to read from those storage device(s) rather than SCM read cache 150 when the read queue depth threshold is exceeded. In such examples, instructions 126 may intelligently decide, on a case-by-case basis, whether it is preferable to bypass the SCM read cache 150 or not, when the read queue depth threshold is exceeded, based on conditions related to the particular storage device(s) from which the read would otherwise happen. In such examples, this individualized determination for different IOs and different backend storage device(s) may lead to overall reduced latency in storage system 102 (or 502, which may also perform these functionalities). In examples described herein, any suitable measure of the utilization of storage device(s) may be used by instructions 126 at block 430. For example, the utilization of a storage device (e.g., a physical storage device, such as a HDD, a SSD, or the like) may be based on the number of outstanding IOs to the storage device at a given time. In such examples, a maximum utilization of the storage device may be represented by a maximum number of IOs that may be permitted to be outstanding at the storage device at one time. In such examples, the utilization of a storage device may be represented as the actual number of IOs outstanding, or as a proportion of the maximum IOs permitted to be outstanding (e.g., 50%, 100%, etc.). In such examples, the utilization threshold may be set as a fixed number of IOs or as a threshold percentage of the maximum utilization (e.g., 50%). In other examples, other measures of utilization may be used.

FIG. 5 is a block diagram of an example system 502 to adjust queue depth thresholds for each of a plurality of SCM caches. The example illustrated in FIG. 5 is different than the example illustrated in FIG. 1, but for ease of illustration, the example illustrated in FIG. 5 expands on the example illustrated in FIG. 1 and described above. However, the examples described in relation to FIG. 5 are not be construed as limiting the examples described above in relation to FIG. 1.

In the example of FIG. 5, storage system 502 comprises a computing device 500, including (as described above in relation to FIG. 1) at least one processing resource 110, a machine-readable storage medium 120 comprising instructions 121, memory 130 including main cache 140, and backend storage 160 comprising a plurality of storage devices 162, 164, 166, 168, etc. As described above, instructions 121 are executable by the at least one processing resource 110 to implement functionalities described herein in relation to FIGS. 1-5. In addition, the example of FIG. 5 illustrates background instructions 522 (including instructions 122 and 124, as described herein) to at least partially implement a background process (or thread), as described above in relation to FIG. 2, and illustrates IO instructions 524 (including instructions 126, as described herein) to at least partially implement an IO process (or thread), as described above in relation to FIG. 4. In the example of FIG. 5, computing device 500 may communicate via one or more computer network(s) with a remote host computing device (e.g., to receive IO requests, such as read IO 582, and return IO responses, etc.), and may communicate via one or more computer network(s) with a remote node (e.g., computing device, storage array, etc.) comprising one or more storage devices (e.g., HDDs, SSDs, etc.), with which computing device 500 may exchange data (e.g., via IO communications 584, etc.).

In the example illustrated in FIG. 5, computing device 100 may comprise a plurality of SCM read caches, 150, 550, 650, etc. Although three SCM read caches are illustrated in computing device 500 in the example of FIG. 5, in examples, computing device 500 may include any suitable number of one or more SCM read caches (e.g., more than three, etc.). In such examples, instructions 121 may be executable to perform the background process of instructions 522 (as described above in relation to FIG. 2, for example) independently for each of the plurality of SCM caches. In such examples, each background process (i.e., for each SCM read cache) is to maintain at least one queue depth threshold independently for each of the SCM caches. For example, for SCM read cache 150, a respective background process may maintain data 152 in memory 130, including at least: (1) a total amount of data in a time period 132, (2) a data rate threshold 134, (3) a number of outstanding read IOs (or requests) 133 (or read queue depth 133), (4) a number of outstanding write IOs (or requests) 135 (or write queue depth 135), (5) a read queue depth threshold 137, and (6) a write queue depth threshold 139. The respective background processes may maintain corresponding data for each of the SCM read caches in memory 130.

For example, for SCM read cache 550, a respective background process may maintain data 552 in memory 130, including at least: (1) a total amount of data in a time period 532, (2) a data rate threshold 534, (3) a number of outstanding read IOs (or requests) 533 (or read queue depth 533), (4) a number of outstanding write IOs (or requests) 535 (or write queue depth 535), (5) a read queue depth threshold 537, and (6) a write queue depth threshold 539. In such examples, for SCM read cache 650, a respective background process may maintain data 652 in memory 130, including at least: (1) a total amount of data in a time period 632, (2) a data rate threshold 634, (3) a number of outstanding read IOs (or requests) 633 (or read queue depth 633), (4) a number of outstanding write IOs (or requests) 635 (or write queue depth 635), (5) a read queue depth threshold 637, and (6) a write queue depth threshold 639.

In some examples, instructions 522 may for each of the plurality of SCM read caches (or "SCM caches"), periodically perform the background process for the SCM cache (as described above), wherein each performance of the background process is performed for a different time period. In such examples, each periodic performance of the background process may include instructions 122 determining an amount of data transferred to and from the respective SCM cache in a given time period, and instructions 124 adjusting at least one queue depth threshold for the respective SCM cache in response to a determination that, based on the determined amount of data, a data rate threshold for the SCM read cache is exceeded (as described above).

In the example of FIG. 5, for each of the plurality of SCM caches, instructions 524 may perform the IO process (as described above) using the respective data 152, 552, 652 for the respective SCM caches, including one or more respective queue depth threshold(s) for the respective SCM caches (e.g., thresholds 137 and 139 for SCM read cache 150; thresholds 537 and 539 for SCM read cache 550; and thresholds 637 and 639 for SCM read cache 650; etc.). For example, for each SCM cache, performing the IO process may comprise instructions 126, in response to a destage request for the respective SCM cache and a determination that a write queue depth of the respective SCM cache is greater than a respective write queue depth threshold for the SCM cache, drop the IO request without writing the data to the SCM cache or backend storage 160. Performing the IO process may further comprise instructions 126, in response to a read request for the respective SCM cache and a determination that a read queue depth of the respective SCM cache is greater than a respective read queue depth threshold for the SCM cache, bypass the respective SCM cache and read the requested data from other storage (e.g., backend storage 160) into main cache 140 (e.g., subject to further determinations in some examples, as described elsewhere herein).

In examples described herein, computing device 500 may determine an appropriate one of the SCM read caches for any given IO request (e.g., via a deterministic process based on an address, etc.).

In examples described herein, the phrase "based on" is not exclusive and should not be read as "based exclusively on". Rather, the phrase "based on" as used herein is inclusive and means the same as the alternative phrasing "based at least on" or "based at least in part on". As such, any determination, decision, comparison, or the like, described herein as "based on" a certain condition, data, or the like, may be understood to mean that the decision, comparison, or the like, is based at least on (or based at least in part on) that condition, data, or the like, and may also be based on other condition(s), data, or the like. In examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

As used herein, a "computing device" may be a server, storage device, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated in FIGS. 1 and 5, storage medium 120 may be implemented by one machine-readable storage medium, or multiple machine-readable storage media.

In examples described herein, a storage array may be a computing device comprising a plurality of storage devices and one or more controllers to interact with host devices and control access to the storage devices. In some examples, the storage devices may include HDDs, SSDs, or any other suitable type of storage device, or any combination thereof. In some examples, the controller(s) may virtualize the storage capacity provided by the storage devices to enable a host to access a virtual object (e.g., a volume) made up of storage space from multiple different storage devices.

In other examples, the functionalities described above in relation to instructions described herein may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein. All of the features disclosed in this specification (including any accompanying claims, abstract and drawings), and/or all of the elements of any method or process so disclosed, may be combined in any combination, except combinations where at least some of such features and/or elements are mutually exclusive. For example, functionalities described herein in relation to any of FIGS. 1-5 may be provided in combination with functionalities described herein in relation to any other of FIGS. 1-5.

What is claimed is:

1. A method of a storage system comprising:
   determining, with at least one processing resource of the storage system, a total amount of data read from and written to a storage class memory (SCM) read cache in a given time period, the storage system comprising a main cache, the SCM read cache, and backend storage;
   adjusting at least one queue depth threshold for the SCM read cache in response to a determination that a data rate threshold for the SCM read cache is exceeded, based on the determined amount of data;
   in response to an input/output (IO) request for the SCM read cache, comparing a queue depth for the SCM read cache to one of the at least one queue depth threshold for the SCM read cache;

selecting between processing the IO request using the SCM read cache, dropping the IO request, and processing the IO request without using the SCM read cache, based on a type of the IO request and a result of the comparison; and performing the selected processing or dropping in response to the selection.

2. The method of claim 1, wherein:

the selecting comprises selecting to drop the IO request, based on a determination that the IO request is a request to destage data to the SCM read cache and the result of the comparison indicating that a current number of write IOs outstanding for the SCM read cache is greater than a write queue depth threshold of the at least one queue depth threshold for the SCM read cache, wherein the queue depth is a write queue depth; and the performing comprises dropping the IO request without writing the data to the SCM read cache or the backend storage, in response to the selection.

3. The method of claim 1, wherein:

the selecting comprises selecting to process the IO request without using the SCM read cache, based on a determination that the IO request is a read request for requested data and the result of the comparison indicating that a current number of read IOs outstanding for the SCM read cache is greater than a read queue depth threshold of the at least one queue depth threshold for the SCM read cache, wherein the queue depth is a read queue depth; and the performing comprises bypassing the SCM read cache and reading the requested data from at least one of backend storage of the storage system or a remote computing device into the main cache of the storage system.

4. The method of claim 1, wherein:

the selecting comprises selecting to process the IO request using the SCM read cache, based on either:
  (i) a determination that the IO request is a request to destage data to the SCM read cache and the result of the comparison indicating that a current number of write IOs outstanding for the SCM read cache is not greater than a write queue depth threshold of the at least one queue depth threshold for the SCM read cache; or
  (ii) a determination that the IO request is a read request to read requested data from the SCM read cache and the result of the comparison indicating that a current number of read IOs outstanding for the SCM read cache is not greater than a read queue depth threshold of the at least one queue depth threshold for the SCM read cache; and the performing comprises, based on the selection, either:
  destaging the data to the SCM read cache; or
  reading the requested data from the SMC read cache.

5. An article comprising at least one non-transitory machine-readable storage medium comprising instructions executable by at least one processing resource of a storage system to:

determine a total amount of data read from and written to a storage class memory (SCM) read cache in a given time period;

adjust at least one of a read and a write queue depth threshold for the SCM read cache in response to a determination that a data rate threshold for the SCM read cache is exceeded, based on the determined amount of data;

in response to an input/output (IO) request for the SCM read cache:
  when processing the IO request includes writing to the SCM read cache and a current number of write IOs outstanding for the SCM read cache is greater than the write queue depth threshold, drop the IO request; and
  when the IO request is a read request for requested data and a current number of read IOs outstanding for the SCM read cache is greater than the read queue depth threshold, bypass the SCM read cache and read the requested data from backend storage of the storage system or from a remote computing device into the main cache of the storage system.

6. The article of claim 5, wherein the instructions to bypass the SCM read cache and read the requested data from the backend storage into the main cache are executable to read the requested data from the backend storage into the main cache without reading the requested data from the SCM read cache.

7. The article of claim 5, wherein:

the instructions to adjust at least one of the read and write queue depth thresholds comprises instructions executable by the at least one processing resource to adjust the read queue depth threshold or the write queue depth threshold in response to a determination that the data rate threshold for the SCM read cache is exceeded, based on the determined amount of data.

8. The article of claim 7, wherein the instructions are executable by the at least one processing resource to, in response to the IO request for the SCM read cache:

when processing the IO request includes writing to the SCM read cache:
  compare the current number of write IOs outstanding for the SCM read cache to the write queue depth threshold; and
  in response to a determination that the current number of write IOs outstanding for the SCM read cache is greater than the write queue depth threshold, drop the IO request; and when the IO request is a read request for requested data:
  compare the current number of read IOs outstanding for the SCM read cache to the read queue depth threshold; and
  in response to a determination that the current number of read IOs outstanding for the SCM read cache is greater than the read queue depth threshold, bypass the SCM read cache and read the requested data from the backend storage into the main cache.

9. The article of claim 8, wherein the instructions are executable by the at least one processing resource to:

in response to a determination, based on the determined amount of data, that the data rate threshold for the SCM read cache is exceeded, perform one of:
  when the write queue depth threshold is above a first minimum value, decrease the write queue depth threshold;
  when the write queue depth threshold has the first minimum value and the read queue depth threshold is above a second minimum value, decrease the read queue depth threshold; and
  when the write queue depth threshold has the first minimum value and the read queue depth threshold has the second minimum value, decrease neither the write queue depth threshold nor the read queue depth threshold.

10. The article of claim 8, wherein the instructions are executable by the at least one processing resource to:
in response to a determination, based on the determined amount of data, that the data rate threshold for the SCM read cache is not exceeded, perform one of:
when the read queue depth threshold is below a first maximum value, increase the read queue depth threshold;
when the read queue depth threshold has the first maximum value and the write queue depth threshold is below a second maximum value, increase the write queue depth threshold; and
when the read queue depth threshold has the first maximum value and the write queue depth threshold has the second maximum value, increase neither the read queue depth threshold nor the write queue depth threshold.

11. The article of claim 5, wherein:
the IO request is a read request or a destage request, wherein the destage request is a request to destage clean data from the main cache into the SCM read cache; and
wherein the write IOs outstanding for the SCM read cache are each implementing destage requests.

12. The article of claim 11, wherein the instructions are executable by the at least one processing resource to:
in response to a determination to destage data from the main cache to the SCM read cache, one of:
destage the data from the main cache to the SCM read cache when the current number of write IOs outstanding for the SCM read cache is not greater than a write queue depth threshold of the at least one queue depth threshold for the SCM read cache; and
skip destaging the data from the main cache to the SCM read cache when the current number of write IOs outstanding for the SCM read cache is greater than the write queue depth threshold.

13. The article of claim 5, wherein the instructions are executable by the at least one processing resource to, for each of a plurality of successive time periods, including the given time period:
accumulate the total amount of data read from and written to the SCM read cache during the time period;
when the time period has elapsed, determine whether the data rate threshold for the SCM read cache is exceeded in the time period based on the accumulated total amount of data for the time period;
adjust at least one of the read and write queue depth thresholds for the SCM read cache in response to a determination that a data rate threshold for the SCM read cache is exceeded in the time period; and
reset the total amount of data to zero in preparation for the next time period.

14. The article of claim 5, wherein the instructions are executable by the at least one processing resource to:
in response to the IO request: and a determination that the current number of IOs outstanding for the SCM read cache is not greater than any of the at least one queue depth threshold for the SCM read cache:
when processing the IO request includes writing to the SCM read cache and the current number of write IOs outstanding for the SCM read cache is not greater the write queue depth threshold, write data associated with the IO request to the SCM read cache; and
when the IO request is the read request and the current number of read IOs outstanding for the SCM read cache is not greater the read queue depth threshold, read the requested data from the SCM read cache.

15. The article of claim 5, wherein the IO request is the read request, and the instructions are executable by the at least one processing resource to:
in response to the read request for the SCM read cache and a determination that a current number of read IOs outstanding for the SCM read cache is greater than the read queue depth threshold:
determine whether to (i) bypass the SCM read cache and read the requested data from the backend storage into the main cache or (ii) read the requested data from the SCM read cache into the main cache regardless of the read queue depth threshold being exceeded, based at least in part on at least one of a measure of the utilization of at least one storage device of the backend storage and locations of each of the at least one storage device.

16. A storage system comprising:
at least one processing resource;
a main cache;
a storage class memory (SCM) read cache;
backend storage; and
at least one non-transitory machine-readable storage medium comprising instructions executable by the at least one processing resource to:
perform a background process comprising:
determining an amount of data transferred to and from the SCM read cache in a given time period; and
adjusting at least one of a read and a write queue depth threshold for the SCM read cache in response to a determination that, based on the determined amount of data, a data rate threshold for the SCM read cache is exceeded; and
perform an input/output (IO) process comprising:
in response to an IO request for the SCM read cache:
when the IO request is a request to destage data to the SCM read cache and a write queue depth of the SCM read cache is greater than the write queue depth threshold, drop the IO request without writing the data to the SCM read cache; and
when the IO request is a read request for requested data and a read queue depth of the SCM read cache is greater than the read queue depth threshold, bypass the SCM read cache and read the requested data from the backend storage or from a remote computing device into the main cache.

17. The storage system of claim 16, further comprising:
a plurality of SCM caches, including the SCM read cache;
wherein the instructions are executable by the at least one processing resource to:
perform the background process independently for each of the plurality of SCM caches, wherein the background process is to maintain at least one queue depth threshold independently for each of the SCM caches; and
for each of the plurality of SCM caches, perform the IO process using the respective at least one queue depth threshold for the SCM cache.

18. The storage system of claim 17, wherein the instructions to perform the background process comprise instructions executable by the at least one processing resource to:
for each of the plurality of SCM caches:

periodically perform the background process for the SCM cache, wherein each performance of the background process is performed for a different time period.

19. The storage system of claim 16, wherein:

the SCM read cache comprises a read cache implemented by an SCM device having lower latency than a serial attached SCSI (SAS) solid state drive (SSD), wherein the NAND SSD is a type of non-volatile memory (NVM; and the SCM device is to communicate with other components of the storage system using a protocol consistent with NVM Express™ (NVMe™).

20. The storage system of claim 19, wherein:

the main cache comprises volatile memory; and the backend storage comprises one or more non-volatile storage devices, wherein the non-volatile storage devices comprise at least one of hard-disk drives (HDDs) or solid state drives (SSDs), or a combination of HDDs and SSDs.

* * * * *